United States Patent [19]
Brezinski et al.

[11] 3,795,038
[45] Mar. 5, 1974

[54] METHOD OF MANUFACTURING MOUNTING PADS FOR ENERGY ABSORBING STEERING COLUMN INSTALLATIONS

[75] Inventors: Richard R. Brezinski, Saginaw; Lyle H. Durkee, Hemlock, both of Mich.

[73] Assignee: General Motors Corporation, Detroit, Mich.

[22] Filed: Mar. 16, 1973

[21] Appl. No.: 342,045

[52] U.S. Cl............ 29/417, 29/DIG. 3, 113/116 HH
[51] Int. Cl............................................. B23p 17/00
[58] Field of Search................ 29/417, 412, DIG. 3; 113/116 H, 116 HH

[56] References Cited
UNITED STATES PATENTS

| | | | |
|---|---|---|---|
| 537,505 | 4/1895 | Van Dorn | 29/417 X |
| 2,668,131 | 2/1954 | Hamm | 29/412 UX |
| 2,737,707 | 3/1956 | Highet et al. | 29/DIG. 3 |
| 3,417,536 | 12/1968 | Jakeway | 29/417 X |
| 3,531,861 | 10/1970 | Golbeck | 29/417 X |

*Primary Examiner*—Charles W. Lanham
*Assistant Examiner*—Victor A. DiPalma
*Attorney, Agent, or Firm*—Saul Schwartz

[57] ABSTRACT

A method of manufacturing mounting pads for energy absorbing steering columns from a flat continuous ribbon of plastically deformable stock, as for example cold rolled steel, the method including the steps of forming a plurality of lugs along each edge of the ribbon at predetermined intervals along the length thereof, bending the lugs at right angles to the plane of the ribbon to define thereon a plurality of channel sections, severing the ribbon at predetermined intervals to define a plurality of pad blanks each including a pair of channel sections, and bending the blanks at right angles to the plane of the ribbon to define closed polygons each having a pair of opposite sides on which are disposed respective ones of the pair of channel sections, each channel section opening outwardly with respect to the interior of the closed polygon.

3 Claims, 9 Drawing Figures

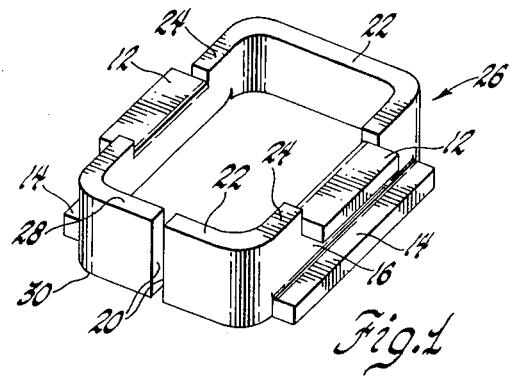
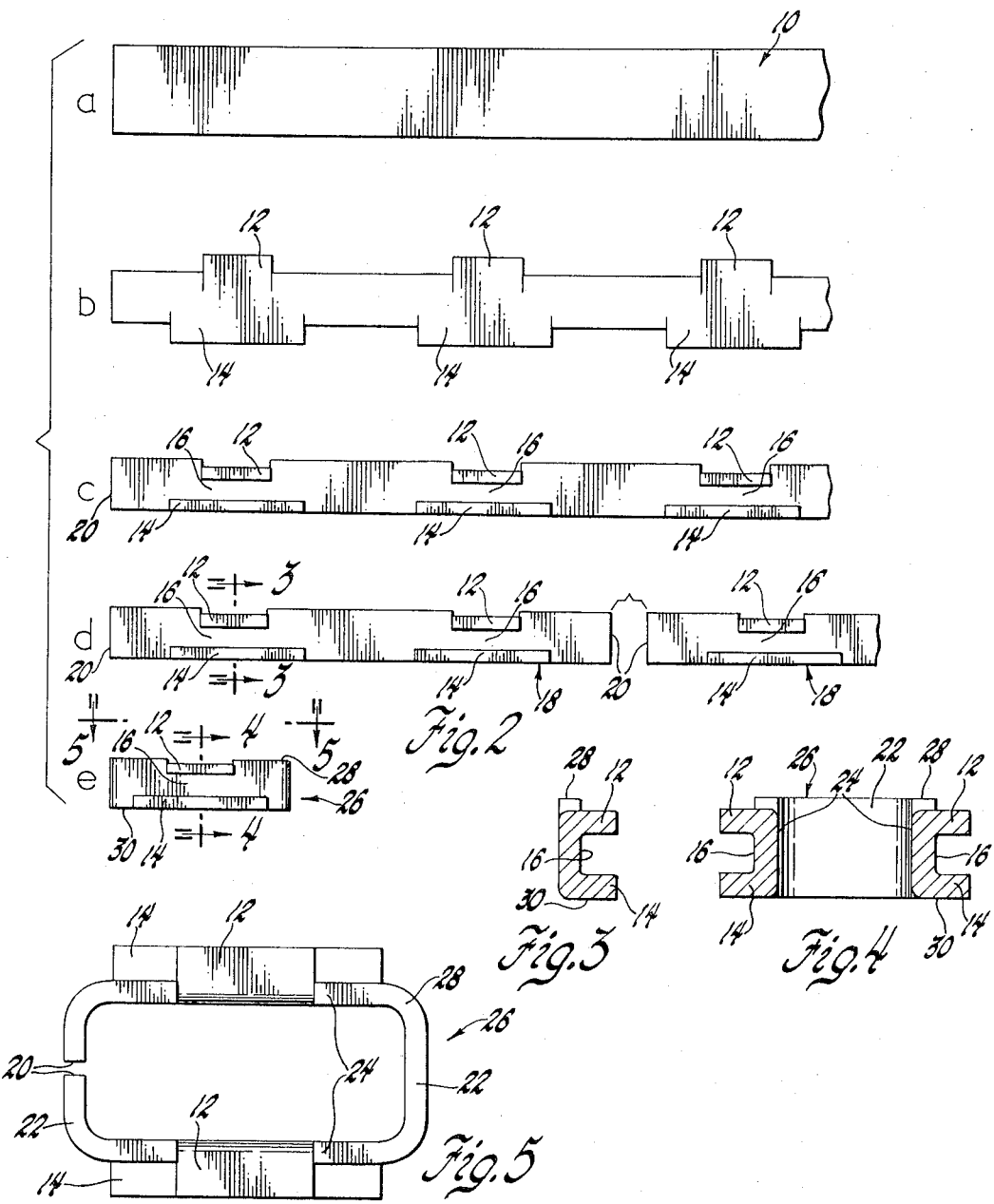

METHOD OF MANUFACTURING MOUNTING PADS FOR ENERGY ABSORBING STEERING COLUMN INSTALLATIONS

This invention relates generally to vehicle steering column installations and, more particularly, to a method of manufacturing a mounting pad adapted for disposition between an energy absorbing steering column assembly and a fixed portion of a vehicle body structure.

A typical energy absorbing steering column assembly includes a lower portion adapted for fixed attachment to a vehicle body and a movable upper portion adapted for axial collapse in an energy absorbing mode under impact. The upper portion is rigidly attached to the vehicle body for normal steering operation through a connection adapted to release or give way when the steering column assembly is sufficiently impacted at the steering wheel end. In many modern vehicles the releasable connection includes a mounting pad which is rigidly attached to the vehicle body and slidably supported on a bracket portion of the steering column assembly, the mounting pad normally being of die cast construction and attached to the bracket portion through a plurality of injection molded plastic pins adapted for fracture upon impact to the column assembly. Die casting and plastic injection molding, relative to some other known manufacturing techniques, are expensive. A mounting pad manufacturing method according to this invention simultaneously eliminates both the die casting and injection molding operations and, accordingly, presents the possibility of substantial manufacturing economies.

The primary feature, then, of this invention is that it provides an improved method of manufacturing mounting pads for energy absorbing steering column installations. Another feature of this invention is that it provides an improved manufacturing method which enables the fabrication of mounting pads from a continuous ribbon of plastically deformable stock, as for example cold rolled steel, thereby facilitating the employment of high volume, relatively low cost stamping techniques. Yet another feature of this invention is that it provides an improved method of manufacturing mounting pads wherein the continuous ribbon of stock undergoes a first forming step wherein a plurality of lugs are formed along each edge at predetermined intervals, a second forming step wherein the lugs are bent at right angles to the plane of the ribbon to define thereon a plurality of channel sections, a third forming step wherein the ribbon is severed at predetermined intervals, and a fourth step wherein the severed ribbon sections are bent to form a closed loop having a pair of channel sections projecting outwardly in opposite directions.

These and other features of this invention will be readily apparent from the following specification and from the drawings wherein:

FIG. 1 is a perspective view of a mounting pad manufactured in accordance with this invention;

FIG. 2 is a view depicting the successive procedures comprising the manufacturing method according to this invention;

FIG. 3 is an enlarged sectional view taken generally along the plane indicated by lines 3—3 in FIG. 2;

FIG. 4 is an enlarged sectional view taken generally along the plane indicated by lines 4—4 in FIG. 2;

FIG. 5 is an enlarged view taken generally along the plane indicated by lines 5—5 in FIG. 2;

Figure 6:
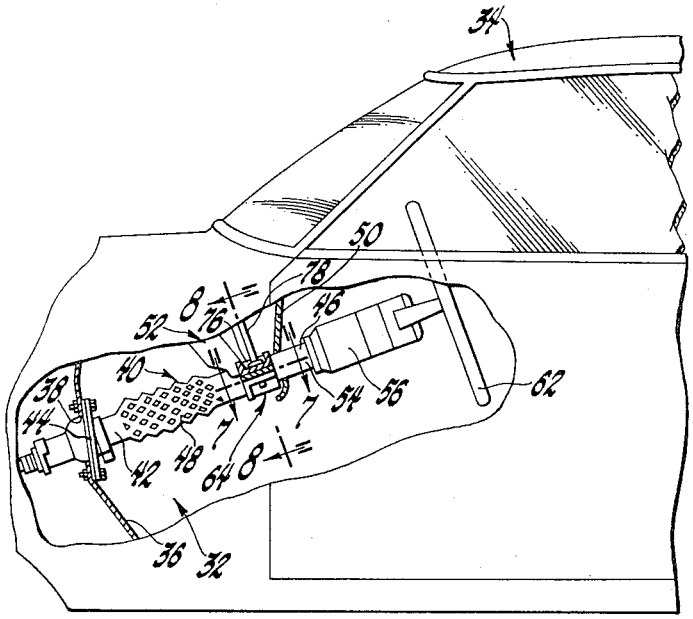
FIG. 6 is a fragmentary partially broken away elevational view of an automobile vehicle body having an energy absorbing steering column assembly supported thereon through a plurality of mounting pads manufactured in accordance with this invention.

Referring now to FIGS. 1 and 2, and describing first the mounting pad and the method or procedure according to this invention by which the latter is manufactured and then the installation and operation thereof, a continuous ribbon 10 of plastically deformable stock, as for example cold rolled steel, of predetermined width and thickness is introduced into any appropriate forming machine which, as a first step in the manufacturing procedure, pierces the ribbon for effecting the removal of a plurality of strips of material from along each edge of the ribbon. As seen best in FIG. 2b, the strips are removed at intervals along the length of the ribbon so that there is defined along one edge of the ribbon a plurality of predeterminedly spaced short lugs 12, and along the opposite edge a corresponding plurality of predeterminedly spaced long lugs 14. The long and short lugs are arranged in pairs at predetermined intervals along the length of the ribbon 10 and the lugs comprising each pair are disposed symmetrically with respect to a transverse plane oriented perpendicularly with respect to the plane of the ribbon, the transverse planes being disposed at predetermined intervals corresponding to the intervals between the succeeding pairs of lugs 12 and 14.

As seen best in FIG. 2c, in the second step of the manufacturing procedure the continuous ribbon 10 with the lugs 12 and 14 thereon is subjected to a second forming operation wherein each of the lugs is distorted or bent to a position disposed perpendicularly with respect to the plane of the ribbon 10. The width of the ribbon and the length of the lugs 12 and 14 are predetermined so that when the lugs are disposed perpendicularly to the plane of the ribbon, the latter cooperates with the portion of the ribbon therebetween in defining a plurality of channel sections 16, FIGS. 3 and 4, of predetermined depth.

Referring to FIG. 2d in the third step of the manufacturing procedure the continuous ribbon 10 is severed at predetermined intervals along its length thereby to define a plurality of flat pad blanks 18. Each blank includes a pair of parallel ends 20 and a pair of channel sections 16 as defined by two pairs of lugs 12 and 14.

As seen best in FIGS. 1, 2e, 4 and 5, in the final step of manufacturing procedure the flat pad blank 18 is permanently distorted, as by bending, in a direction perpendicular to the plane of the ribbon 10 into a substantially closed loop with the parallel ends 20 being brought to generally abutting relationship. The closed loop may assume a number of different polygonal configurations but in the preferred embodiment, FIG. 1, assumes the shape of a parallelogram having a pair of ends 22 and a pair of sides 24. The longitudinal spacing between the two channel sections 16 on each pad blanks 18 is predetermined to insure that when the blank is distorted into the parallelogram configuration the channel sections are disposed centrally on each side 24, each channel section 16, of course, opening outwardly with respect to the interior of the parallelogram.

The end result, then, of the manufacturing procedure according to this invention recited hereinbefore is a mounting pad designated generally 26 fabricated through a plurality of relatively simple steps from the continuous ribbon 10. Each pad 26, FIGS. 1, 4 and 5, is of predetermined depth and includes a top edge 28, a bottom edge 30, and the pair of outwardly extending channel sections 16 also of predetermined depth.

Figure 7:
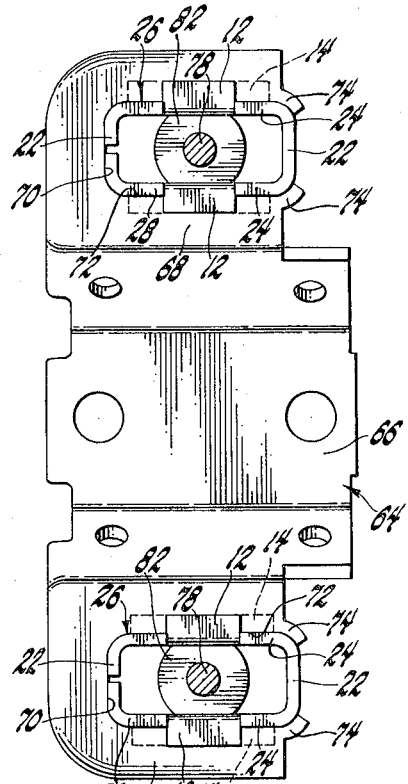
FIG. 7 is an enlarged sectional view taken generally along the plane indicated by lines 7—7 in FIG. 6.
Figure 8:
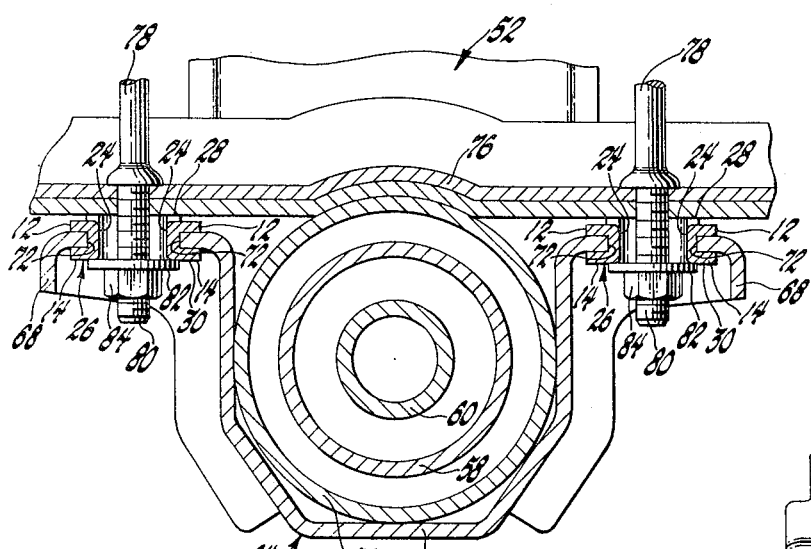
FIG. 8 is an enlarged sectional view taken generally along the plane indicated by lines 8—8 in FIG. 6.
Figure 9:
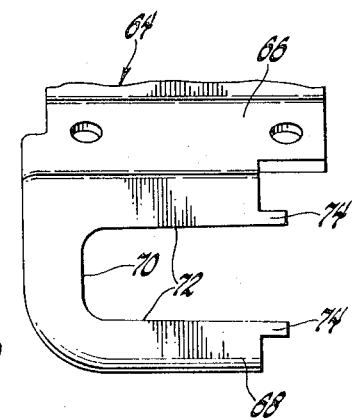
FIG. 9 is a view of a portion of FIG. 7 showing a mounting pad receiving slot in a bracket portion of the steering column assembly.

Referring now to FIGS. 6 through 8 and describing the environment and operation of the pad 26, the latter is adapted for application in an energy absorbing steering column installation 32 in a vehicle body 34. The vehicle body, shown in fragmentary partially broken away view in FIG. 6, includes interiorly thereof a rigid firewall 36 separating the engine compartment of the vehicle from the passenger compartment. The fire wall 36 includes an aperture 38 through which projects the lower portion of a collapsible steering column assembly 40. The steering column assembly 40 is generally conventional and includes a lower portion 42 adapted for rigid anchorage on the fire wall 36 through a plate assembly 44 bolted to the fire wall. The steering column assembly further includes an upper portion 46 connected to the lower column portion 42 through a corrugated metal section 48. The corrugated section 48 normally maintains the upper column portion 46 in rigid relation to the lower column portion 42. In the event of a substantial axially directed impact on the upper column portion the corrugated section 48 is adapted for plastic deformation which effects energy absorption and permits axial collapse of the upper column portion 46 relative to the lower column portion 42. Rearwardly of the fire wall 36 there is disposed transversely across the passenger compartment an instrument panel structure designated generally 50 and forward of the instrument panel structure there is disposed a rigid bracket assembly 52 adapted as described hereinafter for cooperation with mounting pads manufactured in accordance with this invention in releasably supporting the upper column portion 46 on the vehicle body.

As seen best in FIG. 7, the upper column portion 46 includes a cylindrical mast jacket 54 connected at its lower end to the corrugated section 48 and at its upper end to a hub 56. A cylindrical shift tube 58 is rotatably disposed within the mast jacket 54 for manual manipulation in a conventional manner by a shift lever and shift bowl assembly, not shown, rotatably disposed on the hub 56. A steering shaft 60 is rotatably disposed within the shift tube 58 and is connected at its upper end to a steering hand wheel 62 disposed outboard of the hub 56 and at its lower end forward of the fire wall 36 to the vehicle steering gear, not shown.

Referring now to FIGS. 6, 7, 8 and 9, the mast jacket 54 has rigidly attached thereto an instrument panel bracket 64 adapted as described hereinafter for releasable connection to the bracket assembly 52 on the vehicle body. The instrument panel bracket 64 is generally U-shaped in configuration and includes a main body portion 66 embracing and rigidly attached to the mast jacket 54 and a pair of laterally spaced outwardly extending wing flanges 68. Each wing flange has formed therein a generally rectangular slot 70 opening rearwardly with respect to the direction of axial collapse of the upper column portion 46. Each slot includes a pair of side edges 72 extending generally axially of the steering column assembly. At the open ends of the slots 70, each side 72 thereof is extended by a tab 74 integral with the wing flange 68. The instrument panel bracket 64 is located axially along the mast jacket 54 such that in an uncollapsed condition of the steering column assembly, FIGS. 6, 7 and 8, the instrument panel bracket is disposed in juxtaposition with a flange portion 76 of the bracket assembly 52.

The bracket assembly 52 further includes a pair of laterally spaced and generally vertically oriented rods 78 which are rigidly attached to the vehicle body forward of the instrument panel structure 50 and which project downwardly through appropriate apertures in the flange portion 76 of the bracket assembly, each of the rods having a threaded portion 80 extending beyond the lower surface of the flange portion 76, FIG. 8. The slots 70 in the wing flanges 68 on the instrument panel bracket are adapted for registry with the threaded portions 80 of the rod so that in the uncollapsed condition of the steering column assembly the rods are disposed generally centrally in the slots, FIGS. 7 and 8.

Those skilled in the art will recognize, of course, that axial collapse of the upper column portion 46 effects forward movement, FIG. 6, of the instrument panel bracket 64 relative to the flange portion 76 on the bracket assembly 52. Mounting pads 26 manufactured in accordance with this invention function as releasable connectors between the steering column assembly 40 and the vehicle body 34 to permit vehicle control under normal circumstances and collapse of the column assembly under abnormal circumstances. More particularly, and with reference to FIGS. 1 and 6 through 9, each slot 70 in the instrument panel brakcet 64 slidably receives one of the pads 26. The depth of the channel sections 16 on the pads is predetermined to substantially equal the thickness of the wing flanges adjacent the slots 70 so that the pads slide easily in the slots. The pads are retained vertically relative to the wing flanges by the lugs 12 and 14 which engage the flange from above and below, respectively. The pads are retained longitudinally relative to the wing flanges by the tabs 74 which are crimped over behind the pads after the latter are installed in the slots 70.

As seen best in FIGS. 7 and 8, with the pads 26 installed and the steering column assembly in the uncollapsed condition, the rods 78 project through corresponding ones of the pads when the instrument panel bracket is brought into juxtaposition against the flange portion 76 of the bracket assembly 52. Threaded portion 80 on each rod receives therearound a washer 82 and a nut 84, the washer being retained on the rod by the nut. The nuts function to clamp the mounting pads tightly between the flange portion 76 and the washers 82, the flange portion engaging the top edge 28 of the pad and the washer engaging the bottom edge 30 of the pad. Accordingly, the pads 26 are rigidly attached to a fixed portion of the vehicle body structure and, in turn, normally rigidly connect the instrument panel bracket 64 on the steering column assembly to the vehicle body structure.

Under normal operating conditions, the steering column assembly 40, rigidly supported by the rods 78 through the pads 26, functions in a conventional manner to control the direction of the vehicle in response to manual input at the steering hand wheel 62. In the event of the forwardly directed impact on the wheel 62, the upper column portion 46 is urged forwardly. The pads 26, however, being rigidly clamped to the flange portion 76 of the bracket assembly 52 are restrained against similar forward movement so that, at a predetermined force level, the tabs 74 give way to permit the instrument panel bracket 64 to move forward with the upper column portion, the pads 26 simultaneously sliding out of the open end of the slots 70.

Having thus described the invention, what is claimed is:

1. A method of manufacturing a mounting pad for a collapsible steering column assembly from a continuous flat ribbon of plastically deformable stock of predetermined width and thickness comprising the steps of, forming on each edge of said ribbon a plurality of integral lugs disposed at predetermined intervals along the length of said ribbon, bending each of said integral lugs to a position disposed generally perpendicular to the plane of said ribbon so that said integral lugs cooperate in defining a plurality of channel sections disposed at predetermined intervals along the length of said ribbon, severing said ribbon at predetermined intervals along the length thereof thereby to define a plurality of flat pad blanks each including a pair of ends having a pair of said channel sections disposed therebetween, and bending each of said pad blanks in a direction perpendicular to the plane thereof to bring each of said ends into abutting relationship and such that a closed polygon is defined having a pair of opposite sides each including one of said channel sections, each of said channel sections opening outwardly with respect to the interior of said closed polygon.

2. A method of manufacturing a mounting pad for a collapsible steering column assembly from a continuous flat ribbon of plastically deformable stock of predetermined width and thickness comprising the steps of, removing stock from each edge of said ribbon at predetermined intervals along the length of the latter thereby to define a plurality of integral lugs on each edge of said ribbon disposed at predetermined intervals along the length of the latter, bending each of said integral lugs to a position disposed generally perpendicular to the plane of said ribbon so that said integral lugs cooperate in defining a plurality of channel sections disposed at predetermined intervals along the length of said ribbon, severing said ribbon at predetermined intervals along the length thereof thereby to define a plurality of flat pad blanks each including a pair of parallel ends having a pair of said channel sections disposed therebetween, and bending each of said pad blanks in a direction perpendicular to the plane thereof to bring each of said parallel ends into generally abutting relationship and such that a closed parallelogram is defined having a pair of opposite ends and a pair of parallel sides, each of said sides including one of said channel sections and each of said channel sections opening outwardly with respect to the interior of said closed parallelogram.

3. The method recited in claim 2 wherein said integral lugs on each edge of said ribbon are arranged in pairs spaced at predetermined intervals along the length of said ribbon, said integral lugs in each pair being symmetrical with respect to a corresponding one of a plurality of planes perpendicular to the plane of said ribbon and extending transversely of the latter at predetermined intervals along the length thereof.

* * * * *